United States Patent
Lim et al.

(10) Patent No.: US 10,374,249 B2
(45) Date of Patent: Aug. 6, 2019

(54) RECHARGEABLE BATTERY

(71) Applicant: SAMSUNG SDI CO., LTD., Yongin-si, Gyeonggi-do (KR)

(72) Inventors: Young Chang Lim, Yongin-si (KR); Kyung Kim, Yongin-si (KR); Wonseok Kim, Yongin-si (KR); Sangheon Lee, Yongin-si (KR); Jandee Kim, Yongin-si (KR); Kyeongyi Heo, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 43 days.

(21) Appl. No.: 15/653,865

(22) Filed: Jul. 19, 2017

(65) Prior Publication Data

US 2018/0026295 A1    Jan. 25, 2018

(30) Foreign Application Priority Data

Jul. 20, 2016 (KR) .......................... 10-2016-0092249

(51) Int. Cl.
*H01M 2/14*    (2006.01)
*H01M 2/26*    (2006.01)
(Continued)

(52) U.S. Cl.
CPC ......... *H01M 10/0431* (2013.01); *H01M 2/14* (2013.01); *H01M 2/263* (2013.01);
(Continued)

(58) Field of Classification Search
CPC .............................................. H01M 10/0431
(Continued)

(56) References Cited

U.S. PATENT DOCUMENTS 3,028,536 A * 4/1962 Bilsky .................... F21L 4/005
                                                        320/111
2002/0061435 A1   5/2002 Hisai
(Continued)

FOREIGN PATENT DOCUMENTS

JP    63-166143 A    7/1988
JP    10-294102 A    11/1998
(Continued)

OTHER PUBLICATIONS

Extended European Search Report dated Aug. 29, 2017, of the corresponding European Patent Application No. 17182301.6.
(Continued)

*Primary Examiner* — Suresh Memula
(74) *Attorney, Agent, or Firm* — Lee & Morse, P.C.

(57) ABSTRACT

A rechargeable battery includes an electrode assembly including a first electrode, a second electrode, and a separator, the first electrode and the second electrode being wound with the separator therebetween, and a case to receive the electrode assembly, wherein the first electrode includes a first tab part having a first coating region and a plurality of first uncoated tabs protruding out of the first coating region, the first coating region being coated with a first active material, and the plurality of first uncoated tabs not being coated with the first active material, and a first non-tab part connected to the first tab part, the first non-tab part wrapping the first tab part at an outermost portion thereof at least one time.

15 Claims, 5 Drawing Sheets

(51) Int. Cl.
*H01M 2/34* (2006.01)
*H01M 10/04* (2006.01)
*H01M 10/28* (2006.01)
*H01M 10/42* (2006.01)
*H01M 10/0587* (2010.01)

(52) U.S. Cl.
CPC ......... *H01M 2/34* (2013.01); *H01M 10/0587* (2013.01); *H01M 10/281* (2013.01); *H01M 10/425* (2013.01)

(58) Field of Classification Search
USPC .......................................................... 320/128
See application file for complete search history.

(56) References Cited

U.S. PATENT DOCUMENTS

| | | |
|---|---|---|
| 2009/0317700 A1 | 12/2009 | Son et al. |
| 2010/0124694 A1 | 5/2010 | Hikata et al. |
| 2011/0067227 A1 | 3/2011 | Sohn |
| 2011/0129701 A1 | 6/2011 | Seo |
| 2012/0009450 A1 | 1/2012 | Chun |
| 2012/0056590 A1* | 3/2012 | Amiruddin ....... H01M 10/0525 320/130 |
| 2012/0293120 A1* | 11/2012 | Jang .................... H01Q 1/2225 320/108 |
| 2013/0043843 A1* | 2/2013 | Amiruddin ........... H01M 4/131 320/128 |
| 2013/0059183 A1 | 3/2013 | Ahn |
| 2015/0155589 A1 | 6/2015 | Suh et al. |
| 2017/0301959 A1 | 10/2017 | Takahashi et al. |

FOREIGN PATENT DOCUMENTS

| | | |
|---|---|---|
| JP | 2002-157991 A | 5/2002 |
| JP | 2005-196974 A | 7/2005 |
| JP | 2008-117614 A | 5/2008 |
| JP | 2010-118315 A | 5/2010 |
| JP | 2011-65981 A | 3/2011 |
| JP | 2012-23011 A | 2/2012 |
| JP | 2015-109260 A | 6/2015 |
| KR | 10-1156377 B1 | 6/2012 |

OTHER PUBLICATIONS

Japanese Office Action dated Jul. 30, 2018, of the corresponding Japanese Patent Application No. 2017-140743.

* cited by examiner

RECHARGEABLE BATTERY

CROSS-REFERENCE TO RELATED APPLICATION

Korean Patent Application No. 10-2016-0092249, filed on Jul. 20, 2016, in the Korean Intellectual Property Office, and entitled: "Rechargeable Battery," is incorporated by reference herein in its entirety.

BACKGROUND

1. Field

The present disclosure relates to a rechargeable battery.

2. Description of the Related Art

Rechargeable batteries can be repeatedly charged and discharged, unlike primary batteries that cannot be recharged. Low-capacity rechargeable batteries may be used for portable compact electronic apparatuses, e.g., mobile phones, notebook computers, and camcorders, and high-capacity rechargeable batteries may be widely used as a power source, e.g., for driving a motor of a hybrid vehicle, etc.

In general, the rechargeable battery includes an electrode assembly performing the charge and the discharge, and the electrode assembly includes a positive electrode, a negative electrode, and a separator interposed between the positive electrode and the negative electrode. The electrode assembly is formed of a structure in which a plurality of positive electrode plates and negative electrode plates are deposited, but may be formed of a structure in which the positive electrode and the negative electrode of a belt shape are spirally wound. The electrode assembly is received in a case to execute the charge and the discharge, and the case includes a terminal to supply or receive a current. The case may be made as a metal plate or a pouch.

SUMMARY

A rechargeable battery according to an exemplary embodiment of the present disclosure includes an electrode assembly having a first electrode, a second electrode, and a separator, the first electrode and the second electrode being wound with the separator therebetween, and a case to receive the electrode assembly, wherein the first electrode includes a first tab part having a first coating region and a plurality of first uncoated tabs protruding out of the first coating region, the first coating region being coated with a first active material, and the plurality of first uncoated tabs not being coated with the first active material, and a first non-tab part connected to the first tab part, the first non-tab part wrapping the first tab part at an outermost portion thereof at least one time.

The rechargeable battery according to the exemplary embodiment of the present disclosure may further include a first lead tab electrically connecting the plurality of first uncoated tabs and drawn out from the case.

The first non-tab part may include a coating region coated with the first active material without an uncoated tab.

The plurality of first uncoated tabs may be overlapped with each other at one side of the electrode assembly.

The first tab part and the first non-tab part may be integrally formed.

The first non-tab part may wrap the first tab part at the outermost portion thereof three times.

The second electrode may include a second tab part including a second coating region coated with a second active material and a plurality of second uncoated tabs that are protruded to one side of the second coating region and not coated with the second active material, and a second non-tab part connected to the second tab part and wrapping the second tab part at an outermost portion thereof at least one time.

The rechargeable battery according to the exemplary embodiment of the present disclosure may further include a second lead tab electrically connecting the plurality of second uncoated tabs and drawn out from the case.

The second non-tab part may include a coating region coated with the second active material without an uncoated tab.

The plurality of second uncoated tabs may be overlapped with each other at one side of the electrode assembly.

The second tab part and the second non-tab part may be integrally formed.

The second non-tab part may wrap the second tab part at the outermost portion thereof three times.

The first tab part may have first and second edges opposite each other, the first tab part being wound from the first edge, and the first non-tab part being connected to the second edge.

The first non-tab part may extend along an outermost perimeter of at least once.

The first non-tab part may separate the wound first tab part from an interior sidewall of the case.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements.

Figure 1:
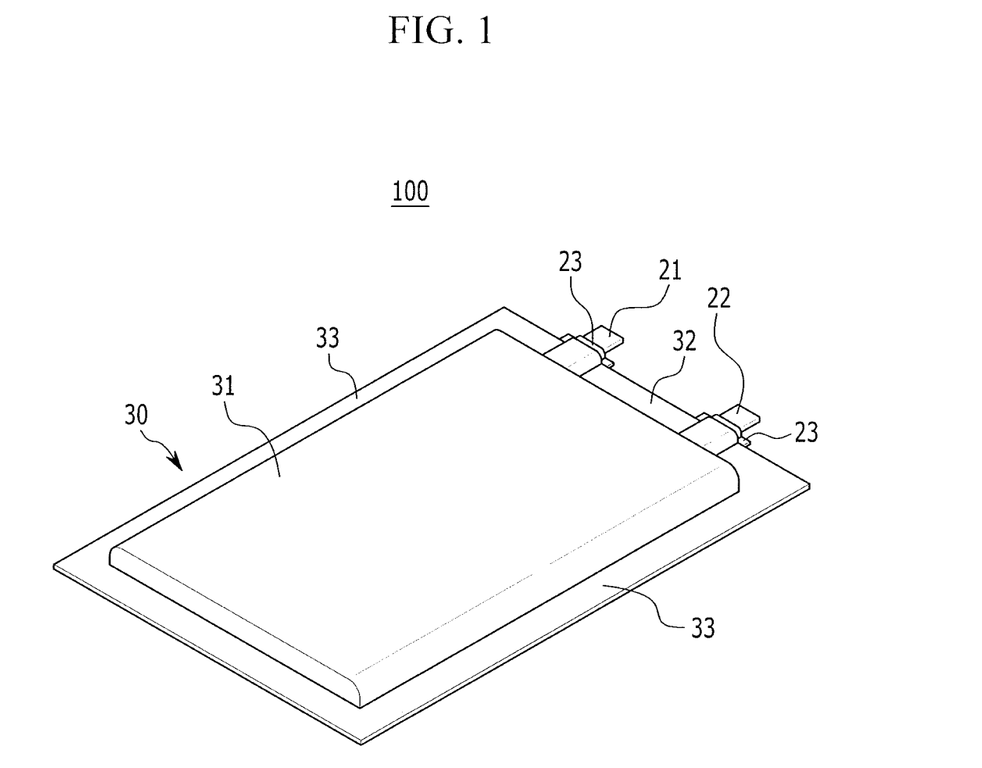
FIG. 1 illustrates a perspective view of a rechargeable battery according to an exemplary embodiment of the present disclosure.

FIG. 1 is a perspective view of a rechargeable battery according to an exemplary embodiment of the present disclosure.

Referring to FIG. 1, a rechargeable battery 100 may include a case 30, and a first lead tab 21 and a second lead tab 22 drawn out from the case 30. The case 30 of the rechargeable battery 100 may be made of a metal plate or a pouch, and hereinafter an example of a pouch case is described.

The case 30 may include a receiving part 31, an edge bonding part 33, and an upper bonding part 32. The case 30 may be made of a film including an insulator. The case 30 may be closed and sealed by bonding of a first plate and a second plate. The first plate and the second plate are heat-sealed to each other at the edge bonding part 33 formed at a side of the receiving part 31 to be bonded to each other. The receiving part 31 protrudes from either one of the first plate and the second plate of the case 30. For example, portions of the first and second plates protrude away from each other to define an empty space, i.e., the receiving part 31, surrounded by the sealed edge bonding part 33 and the upper bonding part 32. An electrode assembly 10 (referring to FIG. 2) and an electrolyte may be received together in the receiving part 31, i.e., in the empty space defined by the first and second plates.

The first lead tab 21 and the second lead tab 22 may be drawn out from the case 30, e.g., to protrude in a length direction of the rechargeable battery 100. The first lead tab 21 and the second lead tab 22 may protrude from the upper bonding part 32 of the case 30 to the outside. The first lead tab 21 and the second lead tab 22 may include a protection tape 23 to prevent a short with the upper bonding part 32.

Figure 2:
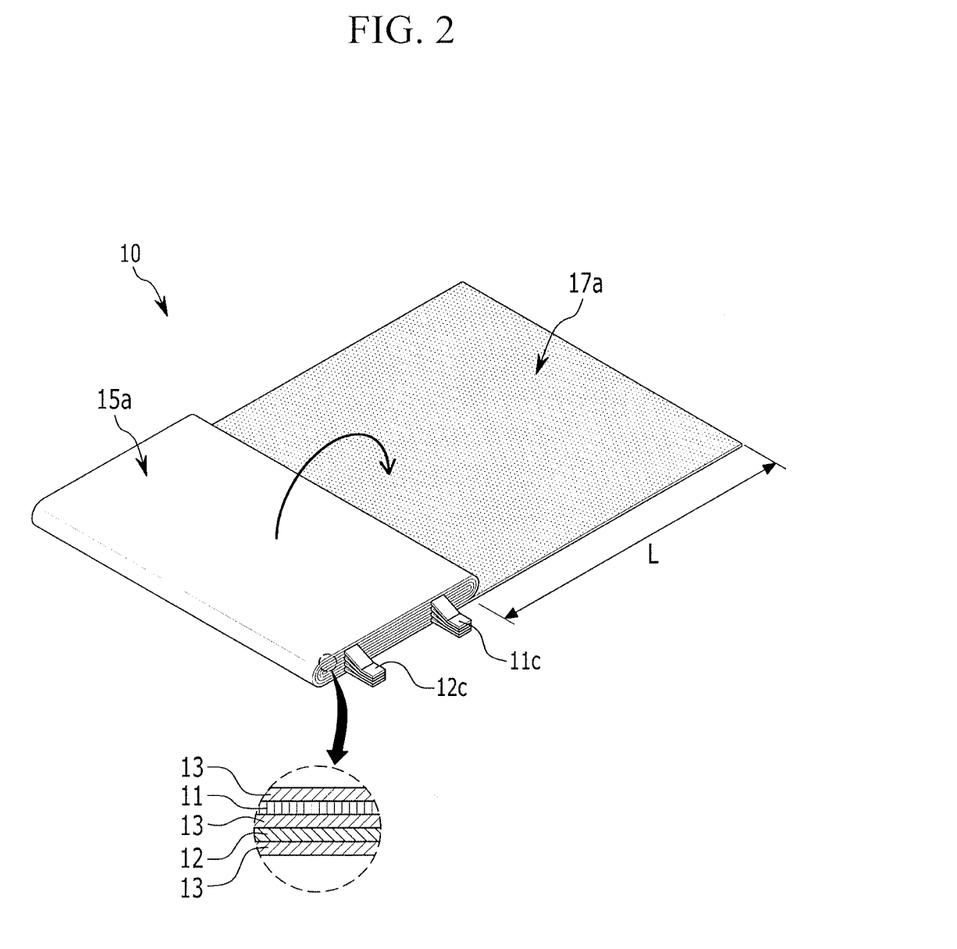
FIG. 2 illustrates a perspective view showing a shape in which a tab part region of an electrode assembly applied to the rechargeable battery in FIG. 1 is spirally wound to a non-tab part region.

FIG. 2 is a perspective view showing a shape in which a non-tab part region is wrapped and spirally wound outside a tab part region of the electrode assembly 10 applied to the rechargeable battery 100.

Referring to FIG. 2, the electrode assembly 10 may include a separator 13 interposed between a first electrode 11 and a second electrode 12. The electrode assembly 10 is formed by spirally winding the first electrode 11, the second electrode 12, and the separator 13. As one example, the electrode assembly 10 is spirally wound and pressed by a press, thereby being manufacturing in an oval shape.

In the electrode assembly 10, a first electrode tab 11c and a second electrode tab 12c protrude at one side of the electrode assembly 10. The first electrode tab 11c and the second electrode tab 12c may be respectively formed by overlapping a plurality of first uncoated tabs 11b (referring to FIG. 3) and a plurality of second uncoated tabs 12b (referring to FIG. 3) respectively extended from the first electrode 11 and the second electrode 12.

Figure 3:
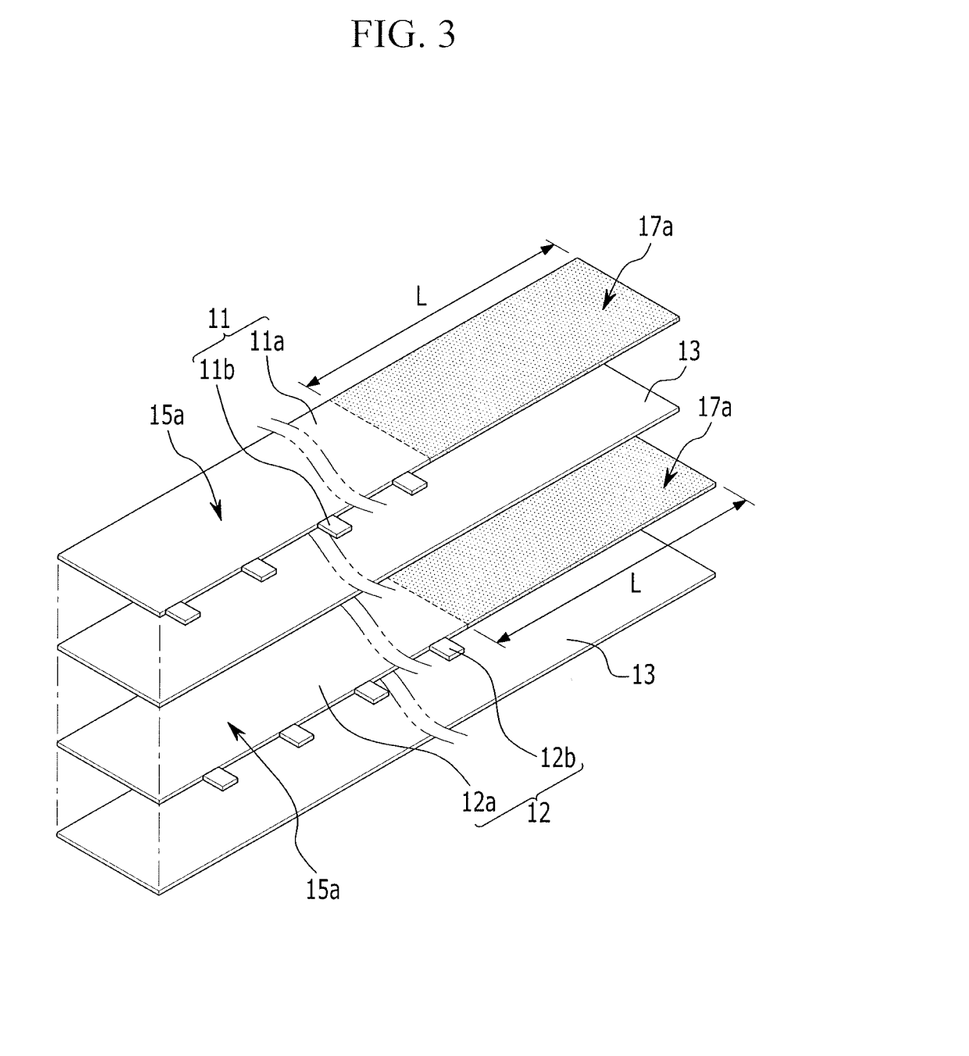
FIG. 3 illustrates an exploded perspective view of an electrode assembly shown in FIG. 2.

The plurality of first uncoated tabs 11b may extend from the first electrode 11 and may protrude to one side of the electrode assembly 10. The plurality of second uncoated tabs 12b may extend from the second electrode 12, may protrude to one side of the electrode assembly 10, and may be separated from the first uncoated tabs 11b. The first electrode tab 11c and the second electrode tab 12c may be respectively electrically connected to the first lead tab 21 and the second lead tab 22 inside the case 30.

The first electrode 11 and the second electrode 12 may include a tab part region 15a, i.e., a region at which the first uncoated tabs 11b and the second uncoated tabs 12b are formed, and a non-tab part region 17a, i.e., a region without the first uncoated tabs 11b and without the second uncoated tabs 12b. For example, as illustrated in FIG. 3, the tab part region 15a and the non-tab part region 17a may be connected to each other. For example, as further illustrated in FIG. 3, the first electrode 11 may include the first coating region 11a that extends continuously in the tab part region 15a and in the non-tab part region 17a, such that the first uncoated tabs 11b are formed only in the first coating region 11a of the tab part region 15a. The second electrode 12 may have a same structure as the first electrode 11.

Figure 4:
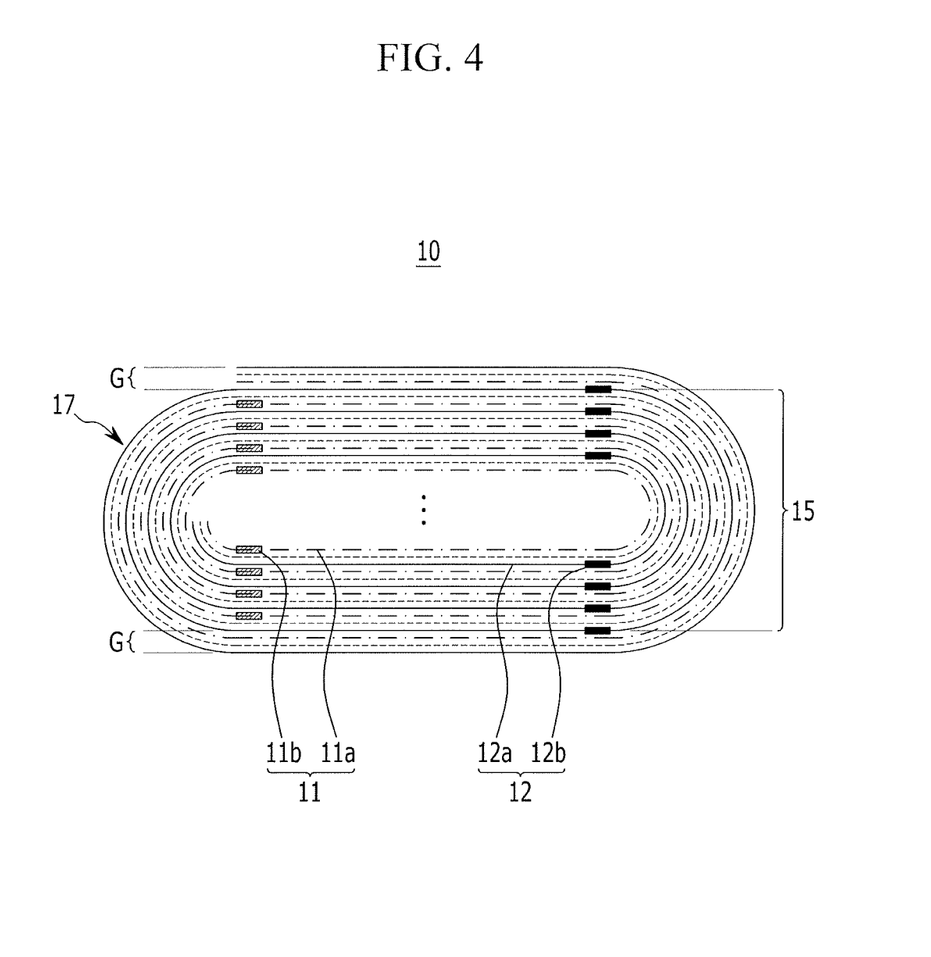
FIG. 4 illustrates a front view showing a shape in which an electrode assembly shown in FIG. 3 is spirally wound.

In detail, the tab part region 15a and the non-tab part region 17a are respectively spirally wound to form a tab part 15 and a non-tab part 17 of the electrode assembly 10, and the non-tab part 17 (referring to FIG. 4) wraps the tab part 15 (referring to FIG. 4). For example, as illustrated in FIG. 4, the winding of the first and second electrodes 11 and 12 may begin at a first edge of the tab part region 15a, i.e., an edge opposite to a second edge connected to the non-tab part region 17a, such that winding of the tab part region 15a defines the tab part 15 with the non-tab part 17 wrapping at least once around an exterior of the tab part 15.

That is, if the tab part region 15a is spirally wound, the tab part 15, in which the plurality of first uncoated tabs 11b and second uncoated tabs 12b protrude in the length direction of the electrode assembly 10, is formed. The non-tab part 17 is positioned outside of the electrode assembly 10 to wrap the exterior of the tab part 15 at least one time. Accordingly, the non-tab part region 17a may be formed with a length L enclosing the outside of the tab part 15 at least one time, e.g., the length L may equal a length of an external perimeter of the tab part 15 along a winding direction.

While the non-tab part 17 wraps the outside of the tab part 15, the first electrode tab 11c and the second electrode tab 12c of the tab part 15 may be separated from the case 30, e.g., from an interior sidewall of the case 30, by a thickness of the non-tab part 17. Accordingly, if the electrode assembly 10 becomes swollen in an abnormal state, the first electrode tab 11c or the second electrode tab 12c and the case 30 may be prevented from being short-circuited. When the non-tab part 17 wraps the outside of the tab part 15 multiple times, the total thickness increases such that the short-preventing effect is improved. For example, the non-tab part 17 may wrap the tab part 15 about three times in consideration of the length of a flow path of the current of the current collector.

FIG. 3 is an exploded perspective view of the electrode assembly 10. Referring to FIG. 2 and FIG. 3, each of the first electrode 11 and the second electrode 12 may include the tab part region 15a and the non-tab part region 17a.

The first electrode 11 may be a negative electrode. The negative electrode may be made of a metal material having excellent conductivity, e.g., a thin copper plate. The negative electrode coating region may be formed of a material in which a negative active material, e.g., a carbon material and the like, is mixed with a binder conductive material and the like. The second electrode 12 may be a positive electrode. The positive electrode may be made of a metal material having excellent conductivity, e.g., a thin aluminum plate. The positive electrode coating region may be formed of a material in which a lithium-based oxide is mixed with a binder, a conductive material, etc. The separator 13 may be formed of a porous material, and may be formed of, e.g., polyolefin, polyethylene, polypropylene, etc.

The first electrode 11 may include a current collector made of a thin metal plate with a strip shape and a first coating region 11a at which the active material is coated on one surface or both surfaces of the current collector. Also, the first uncoated tab 11b that protrudes from the first coating region 11a and is not coated with the active material may be included. The second electrode 12, like the first electrode 11, may include a second coating region 12a, in which the active material is coated on one surface or both surfaces of the current collector, and the second uncoated tab 12b that protrudes from one side of the second coating region 12a and is not coated with the active material.

The first uncoated tab 11b and the second uncoated tab 12b may be formed by forming a non-coated part at each current collector where the active material is not coated at one side of the first coating region 11a and the second coating region 12a. As another example, the first uncoated tab 11b and the second uncoated tab 12b may be formed at the current collector by welding.

A plurality of first uncoated tabs 11b and a plurality of second uncoated tabs 12b may be separated and disposed in the tab part region 15a so that the first uncoated tab 11b and the second uncoated tab 12b may protrude one by one from the electrode assembly 10 for each full wind. As another example, to form the first uncoated tab 11b and the second uncoated tab 12b one by one for each half wind, a plurality of first uncoated tabs 11b and a plurality of second uncoated tabs 12b may be separated and disposed in the tab part region 15a.

Next, the tab part region 15a and the non-tab part region 17a will be described as an example of the first electrode.

The tab part region 15a includes the first coating region 11a and the plurality of first uncoated tabs 11b. As described above, as the tab part region 15a is spirally wound, a tab part 15 (referring to FIG. 4), in which the plurality of first uncoated tabs 11b protrude to one side in the electrode assembly 10, is formed. The non-tab part region 17a may be separated from the final first uncoated tab 11b among a plurality of first uncoated tabs 11b formed in the tab part region 15a to be connected to the tab part region 15a. The non-tab part region 17a may include the first coating region 11a. However, the first uncoated tab 11b is not formed in the non-tab part region 17a.

The non-tab part region 17a may be integrally formed with the tab part region 15a. That is, the tab part region 15a and the non-tab part region 17a may be formed in the current collector of one first electrode 11. However, as another example, the tab part region 15a and the non-tab part region 17a may be separately formed and the non-tab part region 17a may be connected to one side of the tab part region 15a by welding.

The length L of the non-tab part region 17a is formed to wind the outside of the tab part 15 at least one time when spirally winding the tab part region 15a. For example, as described above, the length L of the non-tab part region 17a may wrap the outside of the tab part 15 one time to three times. A plurality of tab part regions 15a and non-tab part regions 17a may be formed, and may be alternately arranged and mutually connected.

FIG. 4 is a front view showing a shape in which the electrode 10 is spirally wound.

Referring to FIG. 2 to FIG. 4, the electrode assembly 10 includes the tab part 15 and the non-tab part 17.

The tab part 15 is positioned inside the electrode assembly 10, and the first uncoated tabs 11b and the second uncoated tabs 12b protrude out of the wound electrode assembly 10. The non-tab part 17 wraps the outside of the tab part 15 and is positioned outermost of the electrode assembly 10.

The non-tab part 17 may wrap the outside of the tab part 15 at least one time. As another example, the non-tab part 17 may wrap the outside of the tab part 15 three times.

The plurality of first uncoated tabs 11b and the plurality of second uncoated tabs 12b protrude out in the tab part 15. The first uncoated tabs 11b and the second uncoated tabs 12b are respectively overlapped, thereby forming the first electrode tab 11c and the second electrode tab 12c. The first electrode tab 11c and the second electrode tab 12c are respectively connected to the first lead tab 21 and the second lead tab 22.

By the number of the wraps of the non-tab part 17, the tab part 15 is separated from the outside of the electrode assembly 10 by a separation distance G. If the non-tab part 17 is wrapped three times, the separation distance G is increased by three times. The first uncoated tabs 11b and the second uncoated tabs 12b may be prevented from being short-circuited with the case 30 (referring to FIG. 1) by the separation distance G. That is, the first electrode tab 11c and the second electrode tab 12c formed by the overlapping of the first uncoated tab 11b and the second uncoated tab 12b are separated from the outside of the electrode assembly 10 by the separation distance G, thereby preventing a short-circuit with the case 30 receiving the electrode assembly 10. Resultantly, the first electrode tab 11c and the second electrode tab 12c are formed inside of the non-tab part 17, and the separation distance G forms a buffer space inside the case 30 such that the short-preventing effect may be improved.

Figure 5:
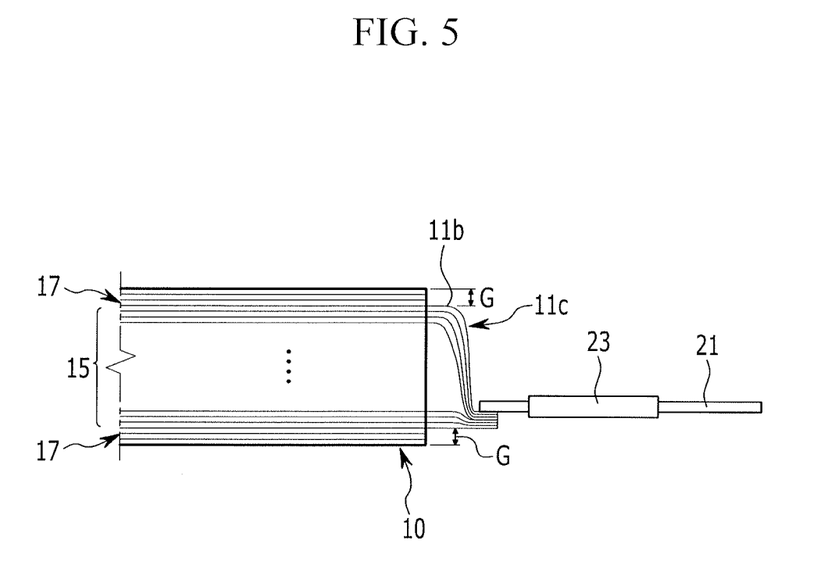
FIG. 5 illustrates a cross-sectional side view of an electrode assembly shown in FIG. 2.

FIG. 5 is a cross-sectional side view of the electrode assembly 10.

Referring to FIG. 5, the first uncoated tabs 11b protrude from the electrode assembly 10 and overlap each other to be connected. Hereinafter, the first lead tab 21 electrically connected to the first electrode tab 11c including the plurality of first uncoated tabs 11b is described as an example.

In detail, the plurality of first uncoated tabs 11b are pressed and overlapped with each other at one side of a short side direction of the electrode assembly 10, thereby forming the first electrode tab 11c. As described above, because the non-tab part 17 is positioned at the outside of the electrode assembly 10 and may be spirally wound in plural to the outside of the tab part 15, the first uncoated tab 11b positioned outermost among the plurality of first uncoated tabs 11b in the first electrode tab 11c and outermost of the electrode assembly 10 are separated by the separation distance G.

As the non-tab part 17 spirally winds the outside of the tab part 15 multiple times, the separation distance G may increase. Accordingly, when the electrode assembly 10 is received by the receiving part 31 (referring to FIG. 1) of the case 30 (referring to FIG. 1), a space may be formed by the separation distance G between the case 30 and the first electrode tab 11c of the electrode assembly 10. Accordingly, even if the electrode assembly 10 is inflated by the swelling phenomenon, the first electrode tab 11c may be prevented from coming into contact with the case 30. That is, the separation distance G formed between the first uncoated tab 11b positioned outermost of the first uncoated tab 11bs in the first electrode tab 11c and the case 30 may function as the buffer zone for preventing the short.

By way of summation and review, when the rechargeable battery is charged or discharged, if a value more than a normal current is charged or discharged, the electrode assembly inside the case may generate a swelling phenomenon, e.g., an electrode tab formed in the electrode assembly may contact the case, thereby causing a short. In contrast, example embodiments provide a rechargeable battery having a winding structure of the electrode assembly that includes a gap between an outermost electrode tab and an interior sidewall of the case, thereby preventing a short between the electrode tab drawn out from the electrode assembly and the interior sidewall of the case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode, a second electrode, and a separator, the first electrode and the second electrode being wound with the separator therebetween; and
   a case to receive the electrode assembly,
   wherein the first electrode includes:
      a first tab part having a first coating region and a plurality of first uncoated tabs protruding out of the first coating region, the first coating region being coated with a first active material, and the plurality of first uncoated tabs not being coated with the first active material, and
      a first non-tab part connected to the first tab part, the first non-tab part wrapping the first tab part at an outermost portion thereof three times.

2. The rechargeable battery as claimed in claim 1, further comprising a first lead tab electrically connecting the plurality of first uncoated tabs, the first lead tab being drawn out from the case.

3. The rechargeable battery as claimed in claim 1, wherein the first non-tab part includes a coating region coated with the first active material without an uncoated tab.

4. The rechargeable battery as claimed in claim 1, wherein the plurality of first uncoated tabs overlap each other at one side of the electrode assembly.

5. The rechargeable battery as claimed in claim 1, wherein the first tab part and the first non-tab part are integrally with each other.

6. The rechargeable battery as claimed in claim 1, wherein the second electrode includes:
   a second tab part having a second coating region and a plurality of second uncoated tabs protruding out of the second coating region, the second coating region being coated with a second active material, and the plurality of second uncoated tabs not being coated with the second active material; and
   a second non-tab part connected to the second tab part, the second non-tab part wrapping the second tab part at an outermost portion thereof at least one time.

7. The rechargeable battery as claimed in claim 6, further comprising a second lead tab electrically connecting the plurality of second uncoated tabs, the second lead tab being drawn out from the case.

8. The rechargeable battery as claimed in claim 6, wherein the second non-tab part includes a coating region coated with the second active material without an uncoated tab.

9. The rechargeable battery as claimed in claim 6, wherein the plurality of second uncoated tabs overlap each other at one side of the electrode assembly.

10. The rechargeable battery as claimed in claim 6, wherein the second tab part and the second non-tab part are integrally with each other.

11. The rechargeable battery as claimed in claim 6, wherein the second non-tab part wraps the second tab part at the outermost portion thereof three times.

12. The rechargeable battery as claimed in claim 1, wherein the first tab part has first and second edges opposite each other, the first tab part being wound from the first edge, and the first non-tab part being connected to the second edge.

13. The rechargeable battery as claimed in claim 12, wherein the first non-tab part extends along an outermost perimeter of at least once.

14. The rechargeable battery as claimed in claim 12, wherein the first non-tab part separates the wound first tab part from an interior sidewall of the case.

15. A rechargeable battery, comprising:
   an electrode assembly including a first electrode, a second electrode, and a separator, the first electrode and the second electrode being wound with the separator therebetween; and
   a case to receive the electrode assembly,
   wherein the first electrode includes:
      a first tab part having a first coating region and a plurality of first uncoated tabs protruding out of the first coating region, the first coating region being coated with a first active material, and the plurality of first uncoated tabs not being coated with the first active material, and
      a first non-tab part connected to the first tab part, the first non-tab part wrapping the first tab part at an outermost portion thereof at least one time,
   wherein the second electrode includes:
      a second tab part having a second coating region and a plurality of second uncoated tabs protruding out of the second coating region, the second coating region being coated with a second active material, and the plurality of second uncoated tabs not being coated with the second active material,
      a second non-tab part connected to the second tab part, the second non-tab part wrapping the second tab part at an outermost portion thereof at least one time, and
      a second lead tab electrically connecting the plurality of second uncoated tabs, the second lead tab being drawn out from the case.

* * * * *